(12) United States Patent
Nakahara (10) Patent No.: US 9,804,372 B2
(45) Date of Patent: Oct. 31, 2017

(54) OPTICAL SYSTEM AND IMAGING APPARATUS INCLUDING THE SAME

(71) Applicant: CANON KABUSHIKI KAISHA, Tokyo (JP)

(72) Inventor: Makoto Nakahara, Utsonomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/132,989

(22) Filed: Apr. 19, 2016

(65) Prior Publication Data
US 2016/0313543 A1 Oct. 27, 2016

(30) Foreign Application Priority Data

Apr. 24, 2015 (JP) .................................. 2015-089581

(51) Int. Cl.
| | |
|---|---|
| G02B 15/00 | (2006.01) |
| G02B 15/22 | (2006.01) |
| G02B 15/24 | (2006.01) |
| G02B 15/08 | (2006.01) |
| G02B 15/26 | (2006.01) |
| G02B 15/16 | (2006.01) |
| G02B 9/10 | (2006.01) |
| G02B 13/04 | (2006.01) |
| G02B 13/18 | (2006.01) |
| G02B 13/24 | (2006.01) |

(52) U.S. Cl.
CPC .............. *G02B 15/22* (2013.01); *G02B 9/10* (2013.01); *G02B 13/04* (2013.01); *G02B 13/18* (2013.01); *G02B 13/24* (2013.01); *G02B 15/00* (2013.01); *G02B 15/08* (2013.01); *G02B 15/161* (2013.01); *G02B 15/24* (2013.01); *G02B 15/26* (2013.01)

(58) Field of Classification Search
CPC ...... G02B 15/00; G02B 15/08; G02B 15/161; G02B 15/22; G02B 15/24; G02B 15/26; G02B 9/10; G02B 13/04; G02B 13/18; G02B 13/24
USPC .................................................. 359/684, 676
See application file for complete search history.

(56) References Cited

U.S. PATENT DOCUMENTS

| | | | | |
|---|---|---|---|---|
| 4,080,047 A * | 3/1978 | Uesugi | ................... | G02B 15/22 359/693 |
| 7,982,970 B2 * | 7/2011 | Wada | ................... | G02B 15/173 348/240.99 |
| 8,493,664 B2 * | 7/2013 | Wada | ..................... | G02B 7/105 359/676 |

(Continued)

FOREIGN PATENT DOCUMENTS

JP 2012-159613 A 8/2012

*Primary Examiner* — William R Alexander
(74) *Attorney, Agent, or Firm* — Canon USA Inc, IP Division (57) ABSTRACT

An optical system includes, in order from an object side toward an image side, a first lens unit having positive refractive power, and a second lens unit having negative refractive power. A distance between consecutive ones of the lens units changes when focusing is performed. The first lens unit is stationary during focusing. The second lens unit is moved toward the image side when focus is changed from an object at infinity to an object at a short distance. Lateral magnification β2 of the second lens unit when focusing on the object at infinity, focal length f1 of the first lens unit, and focal length f2 of the second lens unit are set appropriately to satisfy predetermined mathematical conditions.

21 Claims, 9 Drawing Sheets

(56) References Cited

U.S. PATENT DOCUMENTS

| | | | |
|---|---|---|---|
| 2004/0017617 A1* | 1/2004 | Taki | G02B 9/34 |
| | | | 359/773 |
| 2006/0007342 A1* | 1/2006 | Taki | G02B 7/08 |
| | | | 348/335 |
| 2011/0096416 A1* | 4/2011 | Obama | G02B 13/26 |
| | | | 359/793 |
| 2013/0258497 A1* | 10/2013 | Aoi | G02B 15/17 |
| | | | 359/688 |
| 2015/0378137 A1* | 12/2015 | Obikane | G02B 13/24 |
| | | | 359/745 |

* cited by examiner

OPTICAL SYSTEM AND IMAGING APPARATUS INCLUDING THE SAME

BACKGROUND OF THE INVENTION

Field of the Invention

The present invention relates to an optical system and an imaging apparatus including the same. The present invention is suitable for imaging apparatuses, such as a digital still camera, a video camera, a security camera, and a broadcast camera, including imaging devices; and imaging apparatuses such as a silver-halide camera.

Description of the Related Art

Known focusing methods widely employed in imaging lens systems include an inner focus method and a rear focus method in each of which a lens provided at a position on the image side with respect to a lens provided at the extreme end on the object side is moved for focusing.

Herein, a focusing technique in which a lens provided on the image side with respect to an aperture stop is moved for focusing is referred to as the "rear focus method", and a focusing technique in which a lens provided on the object side with respect to the aperture stop is moved for focusing is referred to as the "inner focus method".

In an imaging lens system employing the inner focus method or the rear focus method, since a relatively small lens is moved for focusing, quick focusing action can be realized.

On the other hand, a macro lens system is known as an imaging lens system intended mainly for short-range imaging with a substantially 1× magnification. An optical system forming the macro lens system is desired to exhibit high optical performance in short-range imaging.

An optical system disclosed by Japanese Patent Application Laid-Open No. 2012-159613 is capable of short-range imaging and employs the rear focus method.

However, in the optical system disclosed by Japanese Patent Application Laid-Open No. 2012-159613, since the refractive power of the focus lens unit is excessively strong, the degree of aberration tends to vary with focusing. Moreover, since the focusing lens unit has the strong negative refractive power, the sizes of optical members provided on the image side with respect to the focusing lens unit tend to increase.

SUMMARY OF THE INVENTION

According to an aspect of the present invention, an optical system includes, in order from an object side toward an image side a first lens unit having positive refractive power, and a second lens unit having negative refractive power. A distance between consecutive ones of the lens units changes when focusing is performed. The first lens unit is stationary during focusing, and the second lens unit is moved toward the image side when focus is changed from an object at infinity to an object at a short distance. The optical system satisfies the following conditional expressions:

$$3.00 < |1-\beta 2^2| < 8.00$$

$$0.20 < |f1/f2| < 0.59$$

where $\beta 2$ denotes lateral magnification of the second lens unit when focusing on the object at infinity, f1 denotes focal length of the first lens unit, and f2 denotes focal length of the second lens unit.

Further features of the present invention will become apparent from the following description of exemplary embodiments with reference to the attached drawings.

DESCRIPTION OF THE EMBODIMENTS

Embodiments of the optical system and the imaging apparatus including the same according to the present invention will now be described in detail with reference to the attached drawings. An optical system according to a general embodiment of the present invention includes, in order from an object side toward an image side, a first lens unit L1 having positive refractive power and a second lens unit L2 having negative refractive power. The distances between the lens units changes when focusing is performed. The term "lens unit" refers to a unit of any lens elements (the lens elements are each hereinafter referred to as "lens") that move together when focusing is performed. Each lens unit only needs to include at least one lens and does not necessarily include a plurality of lenses.

Figure 1A:
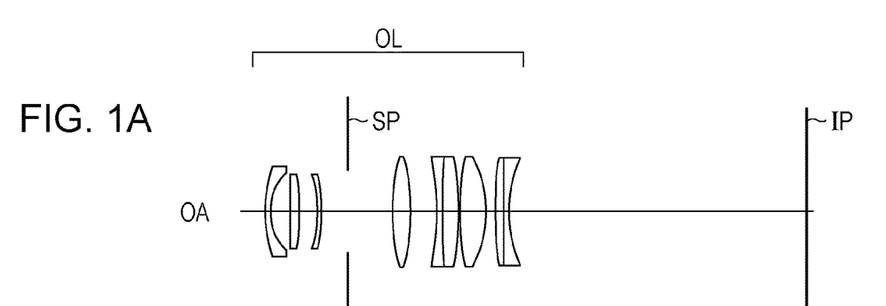
FIGS. 1A and 1B are sectional views of an optical system that is focused on a point at infinity and on a point at a shortest distance, respectively, according to a first embodiment of the present invention.
Figure 1B:
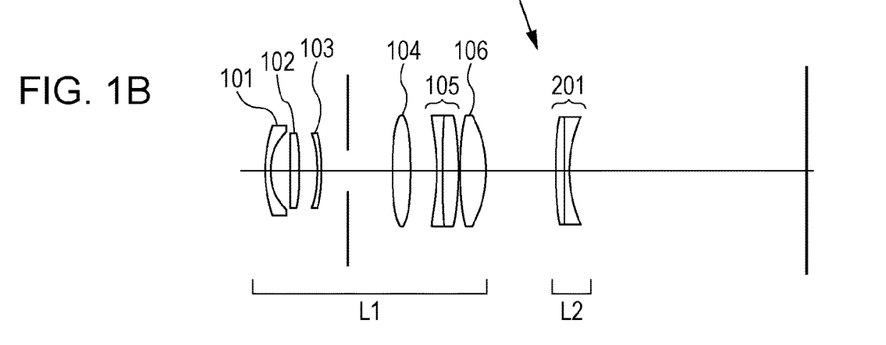
Figure 2A:
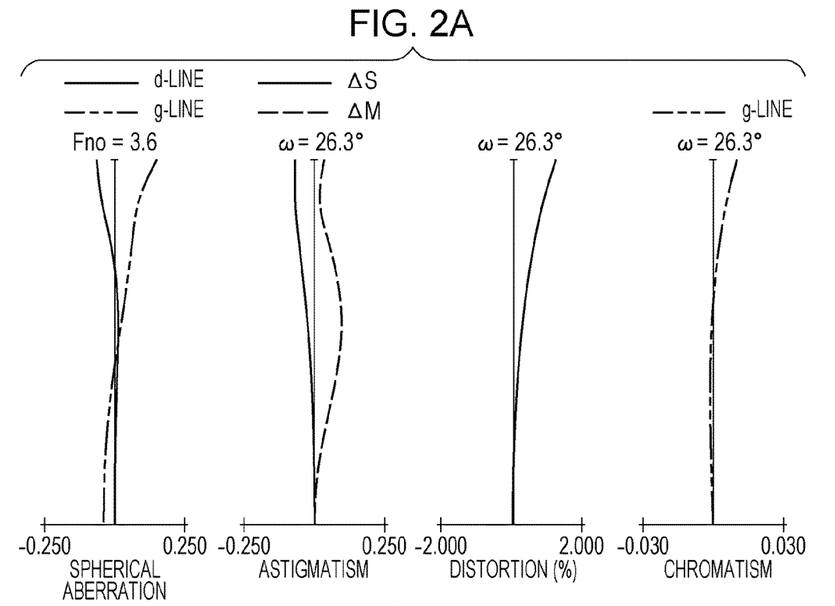
FIGS. 2A and 2B are diagrams illustrating aberrations of the optical system that is focused on the point at infinity and on the point at the shortest distance, respectively, according to the first embodiment.
Figure 2B:
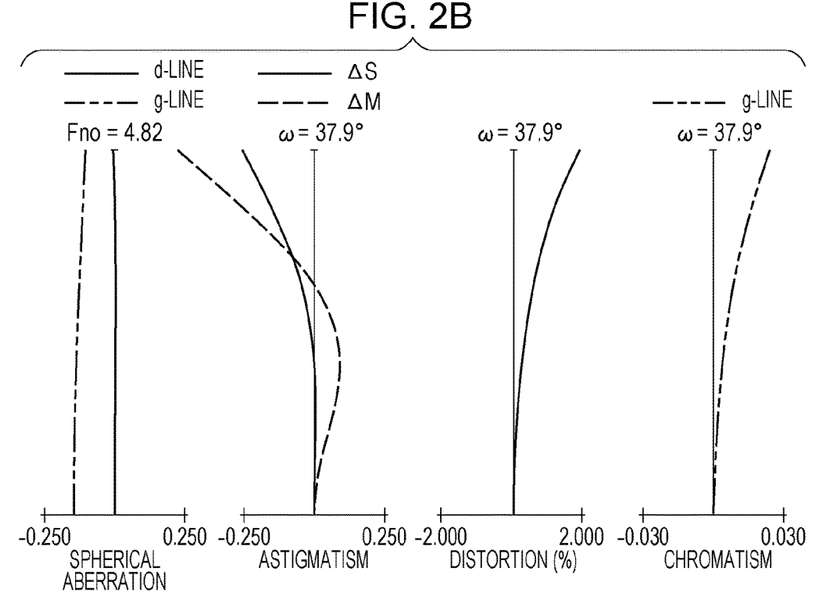

FIGS. 1A and 1B are sectional views of an optical system OL according to a first embodiment of the present invention that is focused on a point at infinity and on a point at a shortest distance, respectively. FIGS. 2A and 2B are diagrams illustrating aberrations of the optical system OL according to the first embodiment that is focused on the point at infinity and on the point at the shortest distance, respectively.

Figure 3A:
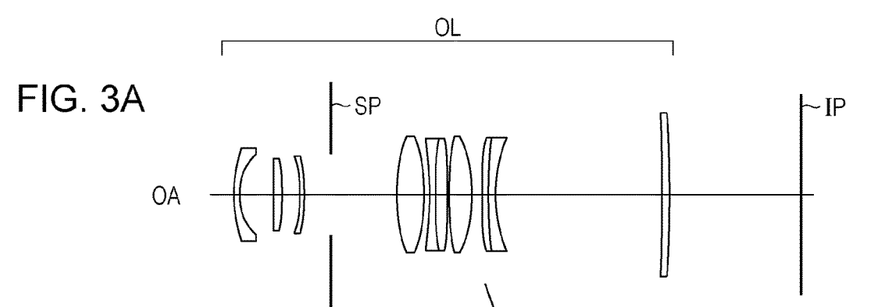
FIGS. 3A and 3B are sectional views of an optical system that is focused on a point at infinity and on a point at a shortest distance, respectively, according to a second embodiment of the present invention.
Figure 3B:
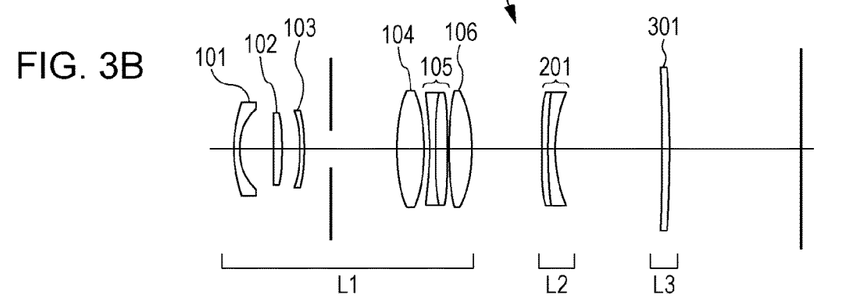
Figure 4A:
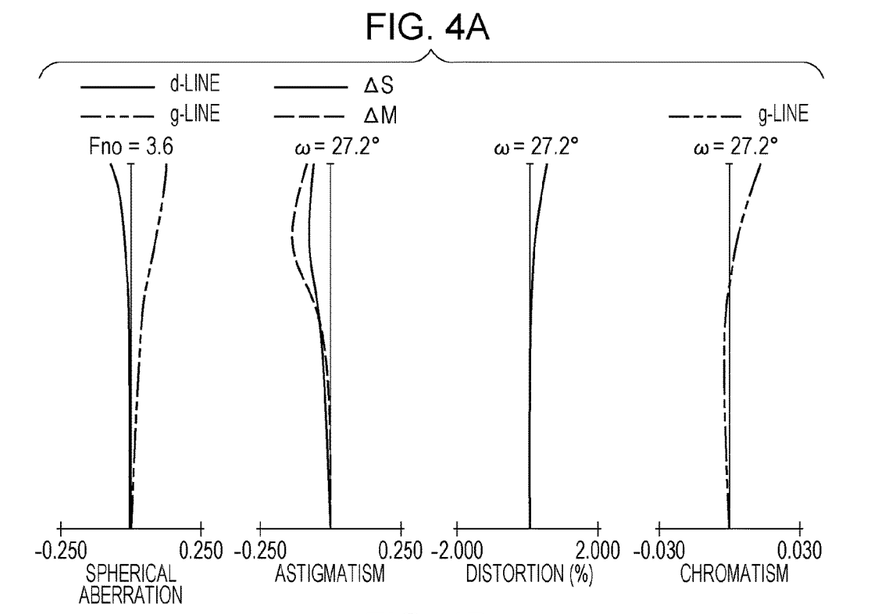
FIGS. 4A and 4B are diagrams illustrating aberrations of the optical system that is focused on the point at infinity and on the point at the shortest distance, respectively, according to the second embodiment.
Figure 4B:
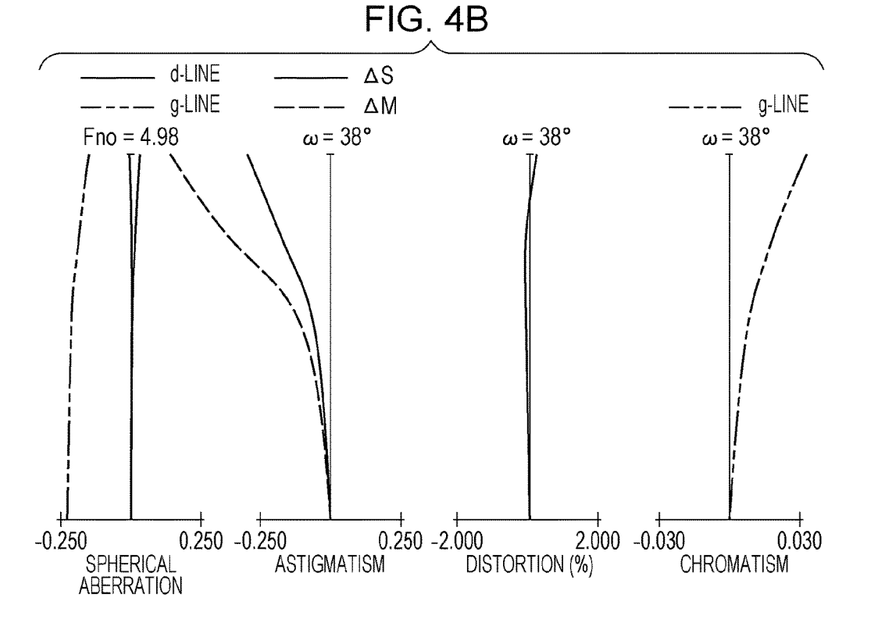

FIGS. 3A and 3B are sectional views of an optical system OL according to a second embodiment of the present invention that is focused on a point at infinity and on a point at a shortest distance, respectively. FIGS. 4A and 4B are diagrams illustrating aberrations of the optical system OL according to the second embodiment that is focused on the point at infinity and on the point at the shortest distance, respectively.

Figure 5A:
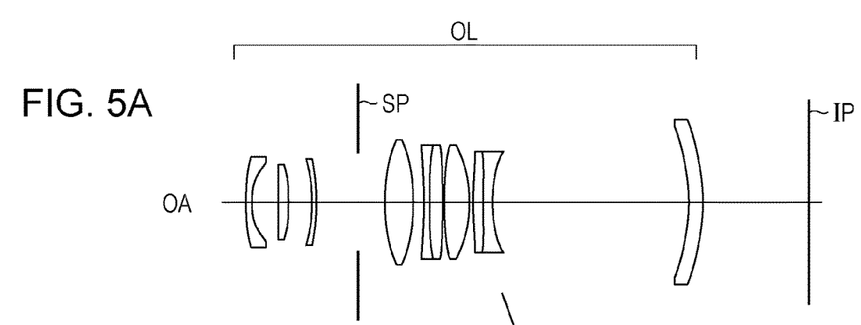
FIGS. 5A and 5B are sectional views of an optical system that is focused on a point at infinity and on a point at a shortest distance, respectively, according to a third embodiment of the present invention.
Figure 5B:
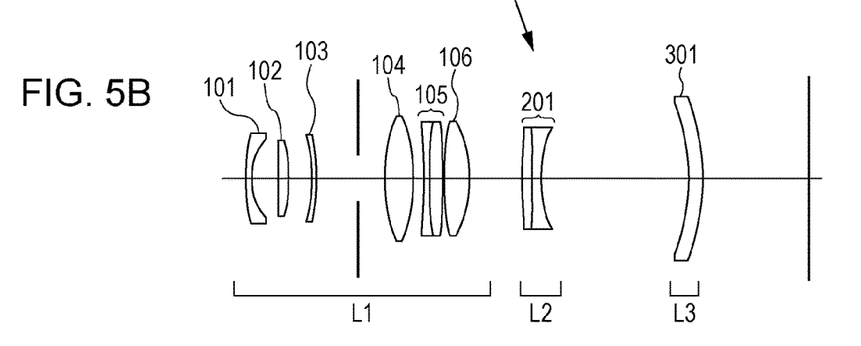
Figure 6A:
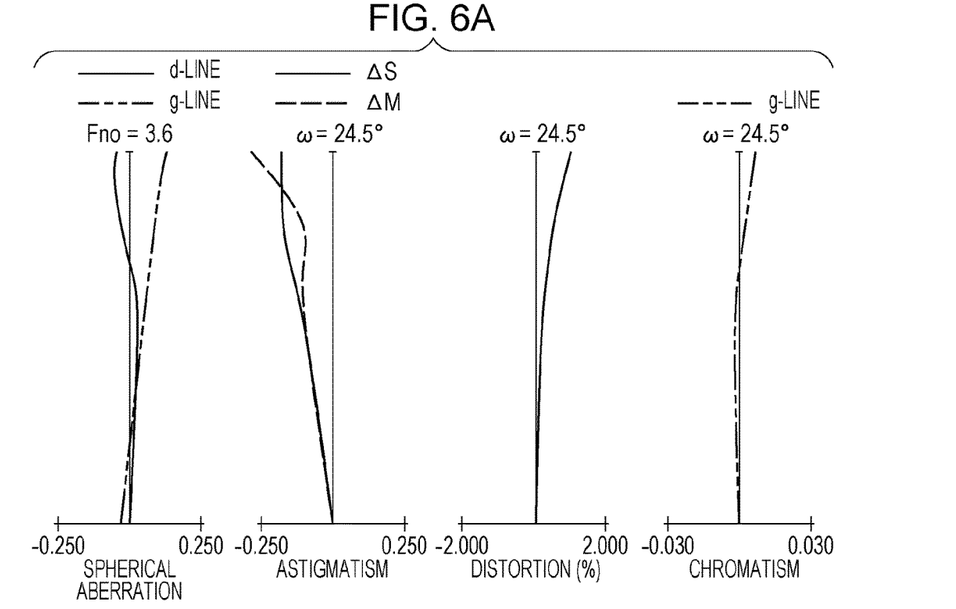
FIGS. 6A and 6B are diagrams illustrating aberrations of the optical system that is focused on the point at infinity and on the point at the shortest distance, respectively, according to the third embodiment.
Figure 6B:
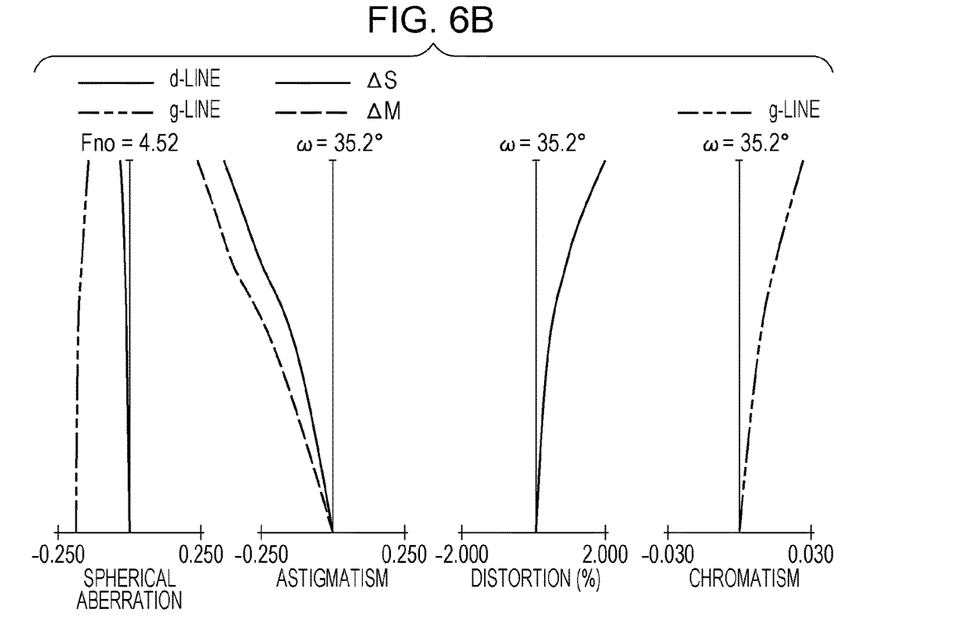

FIGS. 5A and 5B are sectional views of an optical system OL according to a third embodiment of the present invention that is focused on a point at infinity and on a point at a shortest distance, respectively. FIGS. 6A and 6B are diagrams illustrating aberrations of the optical system OL according to the third embodiment that is focused on the point at infinity and on the point at the shortest distance, respectively.

Figure 7A:
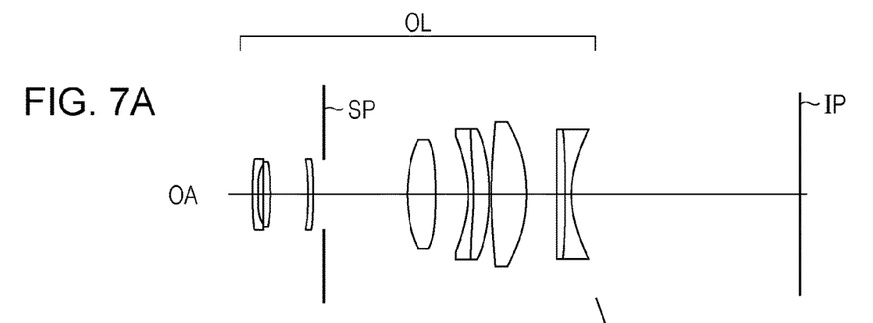
FIGS. 7A and 7B are sectional views of an optical system that is focused on a point at infinity and on a point at a shortest distance, respectively, according to a fourth embodiment of the present invention.
Figure 7B:
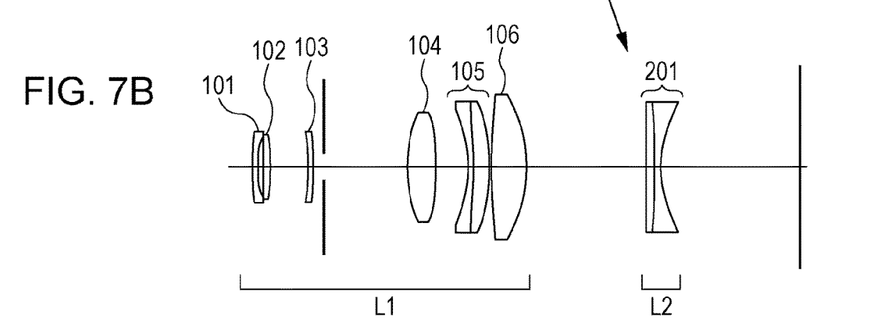
Figure 8A:
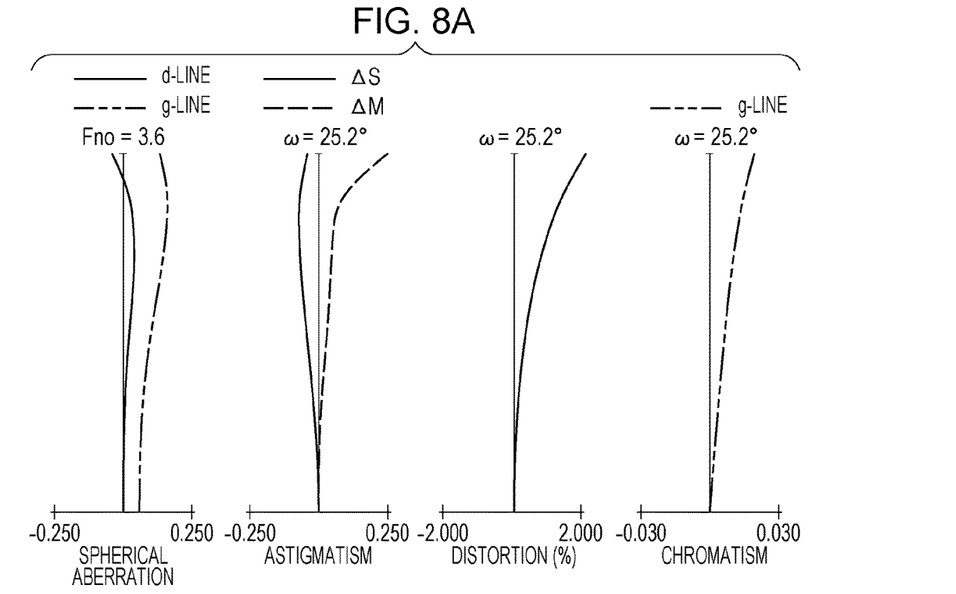
FIGS. 8A and 8B are diagrams illustrating aberrations of the optical system that is focused on the point at infinity and on the point at the shortest distance, respectively, according to the fourth embodiment.
Figure 8B:
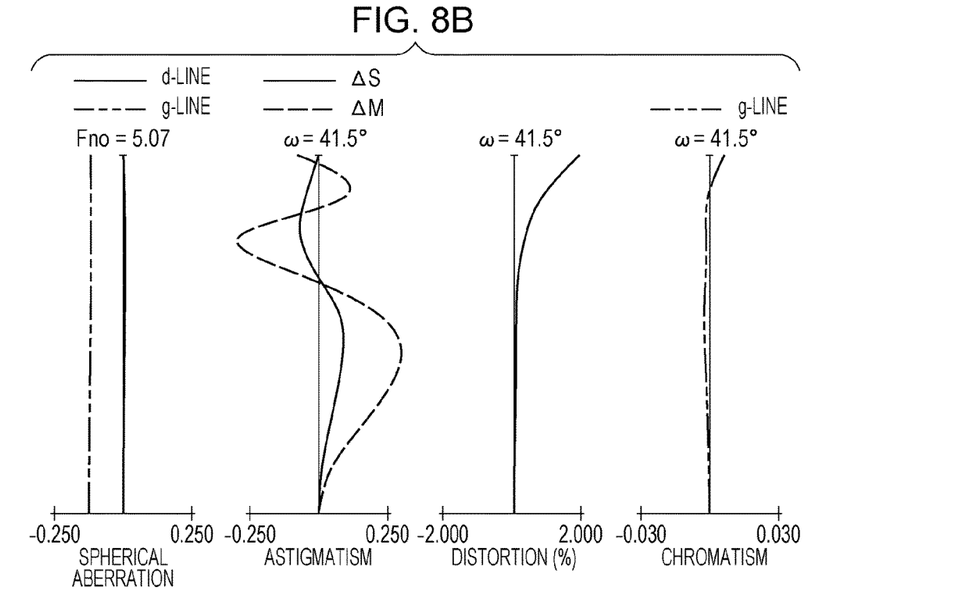

FIGS. 7A and 7B are sectional views of an optical system OL according to a fourth embodiment of the present invention that is focused on a point at infinity and on a point at a shortest distance, respectively. FIGS. 8A and 8B are diagrams illustrating aberrations of the optical system OL according to the fourth embodiment that is focused on the point at infinity and on the point at the shortest distance, respectively.

Figure 9:
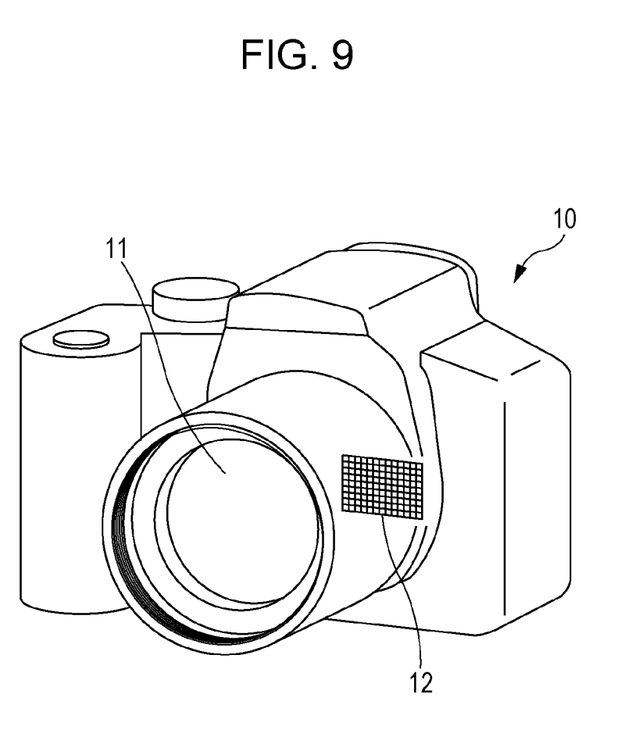
FIG. 9 schematically illustrates relevant parts of an imaging apparatus including any of the optical systems according to the first to fourth embodiments of the present invention.

FIG. 9 schematically illustrates relevant parts of an imaging apparatus including any of the optical systems OL according to the first to fourth embodiments of the present invention. The optical systems OL according to the first to fourth embodiments are each an imaging lens system intended for an imaging apparatus such as a video camera, a digital camera, a silver-halide camera, or a television camera. The left side of each of the sectional views of the optical systems OL is the object side (front side), and the right side is the image side (rear side). In each of the sectional views of the optical systems OL, Li denotes an i-th lens unit, where i denotes the ordinal number of each lens unit when the lens units are counted from the object side toward the image side.

The optical system OL according to each of the first and fourth embodiments consists of a first lens unit L1 having positive refractive power, and a second lens unit L2 having negative refractive power. The optical system OL according to the second embodiment consists of a first lens unit L1 having positive refractive power, a second lens unit L2 having negative refractive power, and a third lens unit L3 having negative refractive power. The optical system OL according to the third embodiment consists of a first lens unit L1 having positive refractive power, a second lens unit L2 having negative refractive power, and a third lens unit L3 having positive refractive power.

In each of the embodiments, an aperture stop SP is provided in the first lens unit L1. If the optical system OL is used as an imaging optical system of a video camera or a digital camera, an image plane IP corresponds to a solid-state imaging device (photoelectric conversion device) such as a charge-coupled-device (CCD) sensor or a complementary-metal-oxide-semiconductor (CMOS) sensor. If the optical system OL is used as an imaging optical system of a silver-halide camera, the image plane IP corresponds to a film surface.

In each of the diagrams illustrating spherical aberration, Fno denotes the f-number, and spherical aberration is graphed for d-line (at a wavelength of 587.6 nm) and for g-line (at a wavelength of 435.8 nm). In each of the diagrams illustrating astigmatism, S denotes the sagittal image plane, and M denotes the meridional image plane. Distortion is graphed for d-line. Chromatism is graphed for g-line. A symbol ω denotes the half angle of view.

In each of the embodiments, when the focus is changed from an object at infinity to an object at a short distance, the second lens unit L2 is moved as represented by an arrow provide between the sectional views, whereby the distance between the second lens unit L2 and each lens unit adjacent (arranged consecutively on either side) thereto changes. Specifically, in the optical system OL according to each of the first and fourth embodiments, when the focus is changed from an object at infinity to an object at a short distance, the second lens unit L2 is moved toward the image side, with the first lens unit L1 being stationary. In the optical system OL according to each of the second and third embodiments, when the focus is changed from an object at infinity to an object at a short distance, the second lens unit L2 is moved toward the image side, with the first lens unit L1 and the third lens unit L3 being stationary. Keeping the third lens unit L3 stationary during focusing contributes to the simplification of a mechanism of driving the optical system OL.

In the optical system OL according to each of the embodiments, some of the lenses included in the first lens unit L1 are movable in a direction containing a component that is perpendicular to an optical axis OA, so that the imaging position can be shifted. Thus, image blur is corrected.

The optical system OL according to each of the embodiments satisfies the following conditional expressions:

$$3.00<|1-\beta 2^2|<8.00 \tag{1}$$

$$0.20<|f1/f2|<0.59 \tag{2}$$

where β2 denotes the lateral magnification of the second lens unit L2 when the focus is on an object at infinity, f1 denotes the focal length of the first lens unit L1, and f2 denotes the focal length of the second lens unit L2.

Conditional Expression (1) defines the lateral magnification β2 of the second lens unit L2 when the focus is on an object at infinity.

If the lateral magnification β2 of the second lens unit L2 becomes higher than the upper limit of Conditional Expression (1), the ranges of variations in aberrations that occur during focusing are widened. Furthermore, focus sensitivity becomes too high, and the focus tends to fluctuate in correspondence with control errors in the position of the second lens unit L2.

If the lateral magnification β2 of the second lens unit L2 becomes lower than the lower limit of Conditional Expression (1), the length of travel of the second lens unit L2 during focusing becomes too long, hindering the realization of a quick focusing action. Furthermore, to provide a satisfactory quantity of marginal light when the focus is on an object at a very short distance, the effective diameter of the second lens unit L2 needs to be increased. Consequently, the size of the optical system OL as a whole increases.

Conditional Expression (2) defines the ratio of the focal length f1 of the first lens unit L1 to the focal length f2 of the second lens unit L2.

If the focal length f1 of the first lens unit L1 becomes too long and the ratio becomes higher than the upper limit of Conditional Expression (2), the refractive power of the first lens unit L1 becomes too weak, increasing the length of the optical system OL as a whole.

If the focal length f1 of the first lens unit L1 becomes too short and the ratio becomes lower than the lower limit of Conditional Expression (2), the refractive power of the first lens unit L1 becomes too strong, hindering appropriate correction of spherical aberration and coma.

Therefore, the above factors are set appropriately in each of the embodiments so that Conditional Expressions (1) and (2) are satisfied and the above-described issues are addressed. Hence, an optical system that exhibits high optical performance, quick focusing action, and is suitable for short-range imaging is provided. Notably, these novel advantages are achieved in spite of optical system's small body afforded by the limited number of lens units and limited amount of moving optical elements.

In each of the embodiments, numerical ranges of Conditional Expressions (1) and (2) are as follows:

$$3.10<|1-\beta2^2|<7.00 \quad (1a)$$

$$0.25<|f1/f2|<0.55 \quad (2a)$$

More preferable numerical ranges of Conditional Expressions (1) and (2) are as follows:

$$3.20<|1-\beta2^2|<6.00 \quad (1b)$$

$$0.30<|f1/f2|<0.53 \quad (2b)$$

In each of the embodiments, in addition to Conditional Expressions (1) and (2), at least one of the following conditional expressions may further be satisfied:

$$0.010<D2/DL<0.090 \quad (3)$$

$$35.00<vd2n<100.00 \quad (4)$$

$$0.65<|DSP/DL|<0.95 \quad (5)$$

$$0.20<BF/f<1.80 \quad (6)$$

$$1.00<|EXP/f|<4.00 \quad (7)$$

$$0.50\leq-\beta \quad (8)$$

where D2 denotes the thickness of the second lens unit L2 on the optical axis OA, DL denotes the thickness of the optical system OL on the optical axis OA when the focus is on an object at infinity, vd2n denotes the Abbe number, for d-line, of a material forming a negative lens included in the second lens unit L2, DSP denotes the distance from the aperture stop SP to the image plane IP on the optical axis OA when the focus is on the object at infinity, BF denotes the back focal length of the optical system OL when the focus is on the object at infinity, f denotes the focal length of the optical system OL when the focus is on the object at infinity, EXP denotes the distance from the exit pupil of the optical system OL to the image plane IP on the optical axis OA when the focus is on the object at infinity, and β denotes the lateral magnification of the optical system OL that is focused on an object at the shortest distance.

The thickness DL of the optical system OL on the optical axis OA corresponds to the distance, on the optical axis OA, from a lens surface at the extreme end on the object side to a lens surface at the extreme end on the image side in the optical system OL. The back focal length BF is the air-equivalent length of the distance from the lens surface at the extreme end on the image side in the optical system OL to the image plane IP.

Conditional Expression (3) defines the ratio of the thickness D2 of the second lens unit L2 on the optical axis OA to the thickness DL of the optical system OL on the optical axis OA when the focus is on an object at infinity.

If the thickness D2 of the second lens unit L2 on the optical axis OA becomes too large and the ratio becomes higher than the upper limit of Conditional Expression (3), the second lens unit L2, which serves as a focusing lens unit, becomes too heavy, hindering the realization of a quick focusing action.

If the thickness DL of the optical system OL on the optical axis OA becomes too large and the ratio becomes lower than the lower limit of Conditional Expression (3), the total optical length becomes too long, hindering the realization of size reduction of the optical system OL.

Conditional Expression (4) defines the Abbe number vd2n, for d-line, of the material forming the negative lens included in the second lens unit L2.

If the Abbe number vd2n, for d-line, of the material forming the negative lens included in the second lens unit L2 becomes larger than the upper limit of Conditional Expression (4), axial chromatic aberration and lateral chromatic aberration are overcorrected, hindering appropriate correction of chromatic aberration.

If the Abbe number vd2n, for d-line, of the material forming the negative lens included in the second lens unit L2 becomes smaller than the lower limit of Conditional Expression (4), it becomes difficult to suppress the variations in the axial chromatic aberration and in the lateral chromatic aberration that may occur during focusing.

Conditional Expression (5) defines the ratio of the distance DSP from the aperture stop SP to the image plane IP on the optical axis OA when the focus is on an object at infinity to the thickness DL of the optical system OL on the optical axis OA when the focus is on the object at infinity. As noted above, DL corresponds to the distance, on the optical axis OA, from a lens surface at the extreme end on the object side to a lens surface at the extreme end on the image side in the optical system OL.

If the distance DSP from the aperture stop SP to the image plane IP on the optical axis OA becomes too long and the ratio becomes higher than the upper limit of Conditional Expression (5), the entrance pupil is shifted toward the object side, increasing the diameter of the second lens unit L2.

If the distance DSP from the aperture stop SP to the image plane IP on the optical axis OA becomes too short and the ratio becomes lower than the lower limit of Conditional Expression (5), the distance from the optical axis OA to off-axis rays traveling through the first lens unit L1 when the focus is on an object at a short distance becomes too long. Consequently, the effective diameter of the first lens unit L1 becomes too large.

Conditional Expression (6) defines the ratio of the back focal length BF of the optical system OL when the focus is on an object at infinity to the focal length f of the optical system OL when the focus is on the object at infinity.

If the back focal length BF of the optical system OL when the focus is on the object at infinity becomes too long and the ratio becomes higher than the upper limit of Conditional Expression (6), the length of the optical system OL becomes too long, hindering the realization of size reduction of the optical system OL.

If the back focal length BF of the optical system OL when the focus is on the object at infinity becomes too short and the ratio becomes lower than the lower limit of Conditional Expression (6), the incident angle of off-axis rays upon the image plane IP becomes too large, making it difficult to suppress the occurrence of shading.

Conditional Expression (7) defines the ratio of the distance EXP from the exit pupil of the optical system OL to the image plane IP on the optical axis OA when the focus is on an object at infinity to the focal length f of the optical system OL when the focus is on the object at infinity.

If the distance EXP from the exit pupil of the optical system OL to the image plane IP on the optical axis OA when the focus is on the object at infinity becomes too long and the ratio becomes higher than the upper limit of Conditional Expression (7), the diameter of the aperture stop SP becomes too large.

If the distance EXP from the exit pupil of the optical system OL to the image plane IP on the optical axis OA when the focus is on the object at infinity becomes too short and the ratio becomes lower than the lower limit of Conditional Expression (7), the effective diameter of the first lens unit L1 becomes too large.

If the lateral magnification β of the optical system OL that is focused on an object at the shortest distance becomes lower than the lower limit of Conditional Expression (8), short-range imaging becomes difficult to perform.

Preferable numerical ranges of Conditional Expressions (3) to (8) are as follows:

$$0.012 < D2/DL < 0.070 \quad (3a)$$

$$37.00 < vd2n < 95.00 \quad (4a)$$

$$0.70 < |DSP/DL| < 0.93 \quad (5a)$$

$$0.30 < BF/f < 1.60 \quad (6a)$$

$$1.20 < |EXP/f| < 3.50 \quad (7a)$$

$$0.70 \le -\beta \quad (8a)$$

More preferable numerical ranges of Conditional Expressions (3) to (8) are as follows:

$$0.015 < D2/DL < 0.050 \quad (3b)$$

$$40.00 < vd2n < 70.00 \quad (4b)$$

$$0.75 < |DSP/DL| < 0.90 \quad (5b)$$

$$0.40 < BF/f < 1.50 \quad (6b)$$

$$1.50 < |EXP/f| < 3.00 \quad (7b)$$

$$0.90 \le -\beta \quad (8b)$$

Now, configurations of the respective lens units will be described.

In the optical system OL according to each of the embodiments, the first lens unit L1 consists of, in order from the object side toward the image side, a negative lens 101, a positive lens 102, a negative lens 103, a positive lens 104, a cemented lens 105 in which a negative lens and a positive lens are cemented together, and a positive lens 106.

In the optical system OL according to each of the embodiments, the second lens unit L2 consists of a cemented lens 201 in which a positive lens and a negative lens provided in that order from the object side toward the image side are cemented together. Since the second lens unit L2 serving as a focusing lens unit consists of the positive lens and the negative lens, the variation in chromatism that may occur during focusing is reduced. Furthermore, since the second lens unit L2 serving as a focusing lens unit consists of two lenses, the weight of the focusing lens unit is reduced, realizing a quick focusing action.

In the optical system OL according to the second embodiment, in addition to the above-described first lens unit L1 and second lens unit L2, the third lens unit L3 consists of one negative lens 301. In the optical system OL according to the third embodiment, the third lens unit L3 consists of one positive lens.

Numerical Examples 1 to 4 corresponding to the first to fourth embodiments, respectively, of the present invention will be given below, in which i denotes the ordinal number given to each of the optical surfaces counted from the object side, ri denotes the radius of curvature of an i-th optical surface, di denotes the distance between the i-th surface and an i+1-th surface, and ndi and vdi denote the refractive index and the Abbe number, respectively, of the material forming the i-th optical member for d-line. Aspherical surfaces are denoted by an asterisk (*).

The shape of each aspherical surface that is calculated on the basis of the displacement in the position of that surface in the optical-axis direction at a height h from the optical axis OA with respect to the vertex of that surface is denoted as x and is expressed as follows:

$$x = (h^2/R)/[1+[1-(1+K)(h/R)^2]^{1/2}] + B \times h^4 + C \times h^6 + D \times h^8 + E \times h^{10}$$

where K denotes the conic constant, B, C, D, and E denote aspherical surface coefficients, and R denotes the paraxial radius of curvature. Furthermore, a value of the form "e-Z" in data on aspherical surfaces given below is equivalent to "$10^{-z}$."

In each of the embodiments, the back focal length (BF) is the air-equivalent length of the distance from the lens surface at the extreme end on the image side in the optical system OL to the image plane IP. Values of the relevant factors defined above and the results of substituting the values into Conditional Expressions (1) to (8) are summarized for each of Numerical Examples 1 to 4 in Table 1 given below.

Numerical Example 1

| Unit: mm | | | | |
|---|---|---|---|---|
| Data on surfaces | | | | |
| Surface No. | r | d | nd | vd |
| 1 | 22.258 | 0.70 | 1.55332 | 71.7 |
| 2* | 7.383 | 2.63 | | |
| 3 | −798.928 | 1.05 | 1.85478 | 24.8 |
| 4 | −38.938 | 2.33 | | |
| 5 | −20.370 | 0.60 | 1.77250 | 49.6 |
| 6 | −33.581 | 3.54 | | |
| 7 (stop) | ∞ | 5.66 | | |
| 8 | 28.548 | 2.56 | 1.51823 | 58.9 |
| 9 | −30.856 | 3.41 | | |
| 10 | −33.879 | 0.70 | 1.85478 | 24.8 |
| 11 | 71.106 | 2.22 | 1.49700 | 81.5 |
| 12 | −29.956 | 0.15 | | |
| 13* | 34.879 | 3.36 | 1.55332 | 71.7 |
| 14* | −14.663 | (variable) | | |
| 15 | 91.971 | 1.04 | 1.92286 | 18.9 |
| 16 | −698.423 | 0.70 | 1.69680 | 55.5 |
| 17* | 16.490 | (variable) | | |
| Image plane | ∞ | | | |

Data on aspherical surfaces

2nd surface

K = −2.70572e−001 B = −3.02643e−005 C = −1.33281e−007
D = −4.86336e−008 E = 7.53127e−010
13th surface K = 4.50041e+000 B = −4.63832e−005 C = −1.90088e−007
D = 3.29560e−009 E = −2.10425e−011
14th surface K = 8.59939e−002 B = 7.73534e−005 C = −1.80446e−007
D = 4.46746e−009 E = −2.19319e−011

-continued

| Unit: mm | | | |
|---|---|---|---|
| Other data | | | |
| Focal length | 27.60 | | |
| F-number | 3.60 | | |
| ½ angle of view | 26.33 | | |
| Image height | 13.66 | | |
| Total lens length | 71.19 | | |
| BF | 39.32 | | |
| | ∞ | −0.5x | −1.0x |
| d14 | 1.21 | 4.94 | 9.34 |
| d17 | 39.32 | 24.65 | 13.62 |

| Data on lens units | | |
|---|---|---|
| Unit | Starting surface | Focal length |
| 1 | 1 | 12.39 |
| 2 | 15 | −31.76 |

Numerical Example 2

| Unit: mm | | | |
|---|---|---|---|
| Data on surfaces | | | |
| Surface No. | r | d | nd | vd |
|---|---|---|---|---|
| 1 | 25.240 | 0.70 | 1.58313 | 59.4 |
| 2* | 7.776 | 4.70 | | |
| 3 | 548.048 | 1.10 | 1.85478 | 24.8 |
| 4 | −36.466 | 2.32 | | |
| 5 | −21.525 | 0.60 | 1.69680 | 55.5 |
| 6 | −41.109 | 3.62 | | |
| 7 (stop) | ∞ | 8.93 | | |
| 8 | 25.728 | 3.81 | 1.49700 | 81.5 |
| 9 | −24.982 | 0.65 | | |
| 10 | −60.128 | 0.70 | 1.85478 | 24.8 |
| 11 | 48.725 | 1.79 | 1.43875 | 94.9 |
| 12 | −155.268 | 0.15 | | |
| 13* | 35.446 | 3.19 | 1.58313 | 59.4 |
| 14* | −18.518 | (variable) | | |
| 15 | 50.873 | 1.10 | 1.95906 | 17.5 |
| 16 | 140.227 | 0.70 | 1.83481 | 42.7 |
| 17 | 17.622 | (variable) | | |
| 18 | −161.333 | 1.00 | 1.51633 | 64.1 |
| 19 | −172.450 | (variable) | | |
| Image plane | ∞ | | | |

Data on aspherical surfaces

2nd surface

K = −3.64721e−001 B = −1.01487e−005 C = −2.39396e−007
D = −8.75839e−009 E = 8.62157e−011
13th surface K = 6.03230e+000 B = −4.64428e−005 C = −2.95139e−007
D = 5.76379e−009 E = −6.03188e−011
14th surface K = 4.67183e−001 B = 6.07945e−005 C = −2.14690e−007
D = 6.17469e−009 E = −5.63737e−011

| Other data | |
|---|---|
| Focal length | 26.56 |
| F-number | 3.60 |
| ½ angle of view | 27.22 |
| Image height | 13.66 |
| Total lens length | 77.00 |
| BF | 17.69 |
| | ∞ | −0.5x | −1.0x |
| d14 | 1.24 | 5.07 | 9.56 |
| d17 | 23.01 | 19.18 | 14.70 |
| d19 | 17.69 | 6.96 | 0.22 |

| Data on lens units | | |
|---|---|---|
| Unit | Starting surface | Focal length |
| 1 | 1 | 12.22 |
| 2 | 15 | −35.00 |
| 3 | 18 | −5000.00 |

Numerical Example 3

| Unit: mm | | | |
|---|---|---|---|
| Data on surfaces | | | |
| Surface No. | r | d | nd | vd |
|---|---|---|---|---|
| 1 | 30.812 | 0.70 | 1.58313 | 59.4 |
| 2* | 7.969 | 3.68 | | |
| 3 | −190.474 | 1.27 | 1.85478 | 24.8 |
| 4 | −28.319 | 3.09 | | |
| 5 | −21.180 | 0.60 | 1.69680 | 55.5 |
| 6 | −36.459 | 5.65 | | |
| 7 (stop) | ∞ | 3.35 | | |
| 8 | 22.380 | 3.84 | 1.49700 | 81.5 |
| 9 | −22.323 | 1.45 | | |
| 10 | −71.851 | 0.60 | 1.85478 | 24.8 |
| 11 | 34.467 | 1.94 | 1.49700 | 81.5 |
| 12 | −438.352 | 0.15 | | |
| 13* | 33.224 | 3.33 | 1.58313 | 59.4 |
| 14* | −17.325 | (variable) | | |
| 15 | 77.106 | 1.51 | 1.80809 | 22.8 |
| 16 | −82.773 | 1.00 | 1.77250 | 49.6 |
| 17 | 16.455 | (variable) | | |
| 18 | −31.477 | 2.00 | 1.48749 | 70.2 |
| 19 | −30.109 | (variable) | | |
| Image plane | ∞ | | | |

Data on aspherical surfaces

2nd surface

K = −3.75093e−001 B = −3.42161e−006 C = 7.08749e−007
D = −4.04432e−008 E = 5.14453e−010
13th surface K = 5.60586e+000 B = −5.62247e−005 C = −1.37042e−007
D = 8.66582e−009 E = −7.10069e−011
14th surface K = 1.33673e−001 B = 6.81269e−005 C = −2.54151e−008
D = 9.16855e−009 E = −6.75387e−011

| Other data | |
|---|---|
| Focal length | 30.00 |
| F-number | 30.00 |
| ½ angle of view | 24.48 |
| Image height | 13.66 |
| Total lens length | 75.00 |
| BF | 13.99 |

-continued

Unit: mm

|     | ∞     | −0.5x | −1.0x |
|-----|-------|-------|-------|
| d14 | 0.50  | 3.65  | 7.24  |
| d17 | 26.35 | 23.20 | 19.61 |
| d19 | 13.99 | 2.05  | −5.34 |

Data on lens units

| Unit | Starting surface | Focal length |
|------|------------------|--------------|
| 1    | 1                | 12.20        |
| 2    | 15               | −28.30       |
| 3    | 18               | 960.75       |

Numerical Example 4

Unit: mm

Data on surfaces

| Surface No. | r        | d         | nd      | vd   |
|-------------|----------|-----------|---------|------|
| 1           | 32.704   | 0.70      | 1.55332 | 71.7 |
| 2*          | 11.509   | 0.77      |         |      |
| 3           | −119.484 | 0.94      | 1.85478 | 24.8 |
| 4           | −39.215  | 5.00      |         |      |
| 5           | −26.950  | 0.60      | 1.77250 | 49.6 |
| 6           | −79.036  | 1.46      |         |      |
| 7 (stop)    | ∞        | 10.97     |         |      |
| 8           | 19.248   | 3.83      | 1.52249 | 59.8 |
| 9           | −34.893  | 4.18      |         |      |
| 10          | −21.218  | 0.70      | 1.85478 | 24.8 |
| 11          | −139.045 | 2.29      | 1.49700 | 81.5 |
| 12          | −24.260  | 0.15      |         |      |
| 13*         | 39.372   | 5.01      | 1.55332 | 71.7 |
| 14*         | −17.335  | (variable)|         |      |
| 15          | −262.821 | 1.10      | 1.95906 | 17.5 |
| 16          | −79.554  | 0.70      | 1.60311 | 60.6 |
| 17          | 16.537   | (variable)|         |      |
| Image plane | ∞        |           |         |      |

Data on aspherical surfaces

2nd surface $K = -9.66626e-001$ $B = 5.74673e-005$ $C = 1.39554e-006$
$D = -4.71623e-008$ $E = 2.23239e-010$ 13th surface $K = -6.23510e+000$ $B = -4.93924e-005$ $C = -1.61181e-007$
$D = -1.33657e-009$ $E = -2.49433e-011$ 14th surface $K = 6.20925e-001$ $B = 5.48865e-005$ $C = -9.53890e-008$
$D = -2.28298e-010$ $E = -1.68527e-011$ Other data

| Focal length      | 29.02 |
| F-number          | 3.60  |
| ½ angle of view   | 25.21 |
| Image height      | 13.66 |
| Total lens length | 72.61 |
| BF                | 30.21 |

|     | ∞     | −0.5x | −1.0x |
|-----|-------|-------|-------|
| d14 | 4.01  | 8.91  | 15.87 |
| d17 | 30.21 | 14.67 | 2.92  |

Unit: mm

Data on lens units

| Unit | Starting surface | Focal length |
|------|------------------|--------------|
| 1    | 1                | 13.95        |
| 2    | 15               | −28.01       |

TABLE 1

| Factors | 1st embodiment | 2nd embodiment | 3rd embodiment | 4th embodiment |
|---------|----------------|----------------|----------------|----------------|
| β2      | 2.23           | 2.16           | 2.44           | 2.08           |
| f1      | 12.39          | 12.22          | 12.20          | 13.95          |
| f2      | −31.76         | −35.00         | −28.30         | −28.01         |
| D2      | 1.74           | 1.80           | 2.51           | 1.80           |
| DL      | 71.19          | 77.00          | 75.00          | 72.61          |
| νd2n    | 55.53          | 42.73          | 49.60          | 60.64          |
| DSP     | 60.33          | 63.96          | 60.00          | 63.15          |
| BF      | 39.32          | 17.69          | 13.99          | 30.21          |
| f       | 27.60          | 27.60          | 30.00          | 29.02          |
| EXP     | 61.36          | 65.20          | 58.11          | 63.96          |
| β       | −1.00          | −1.00          | −1.00          | −1.00          |
| Conditional Expression | | | | |
| (1)     | 3.97           | 3.67           | 4.95           | 3.33           |
| (2)     | 0.39           | 0.35           | 0.43           | 0.50           |
| (3)     | 0.024          | 0.023          | 0.033          | 0.025          |
| (4)     | 55.53          | 42.73          | 49.60          | 60.64          |
| (5)     | 0.85           | 0.83           | 0.80           | 0.87           |
| (6)     | 1.42           | 0.64           | 0.47           | 1.04           |
| (7)     | 2.22           | 2.36           | 1.94           | 2.20           |
| (8)     | 1.00           | 1.00           | 1.00           | 1.00           |

A digital still camera (an imaging apparatus) including the optical system OL according to any of the above embodiments of the present invention as an imaging optical system will now be described with reference to FIG. 9. The digital still camera illustrated in FIG. 9 includes a camera body 10, an imaging optical system 11 corresponding to the optical system OL according to any of the first to fourth embodiments, and a solid-state imaging device 12 (a photoelectric conversion device) such as a CCD sensor or a CMOS sensor. The solid-state imaging device 12 is provided in the camera body 10 and receives an optical object image that is formed by the imaging optical system 11.

Applying the optical system OL according to any of the above embodiments of the present invention to an imaging apparatus such as a digital still camera as described above provides an imaging apparatus that is suitable for short-range imaging and exhibits high optical performance in spite of its small body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-089581, filed Apr. 24, 2015, which is hereby incorporated by reference herein in its entirety.

What is claimed is:

1. An optical system comprising, in order from an object side toward an image side:
   a first lens unit having positive refractive power; and
   a second lens unit having negative refractive power,
   wherein a distance between consecutive ones of the lens units changes when focusing is performed,
   wherein the first lens unit is stationary during focusing, and the second lens unit is moved toward the image side when focus is changed from an object at infinity to an object at a short distance, and
   wherein the optical system satisfies the following conditional expressions:

$3.00 < |1-\beta2^2| < 8.00$ $0.20 < |f1/f2| < 0.59$ $0.010 < D2/DL < 0.090$ where β2 denotes lateral magnification of the second lens unit when focusing on the object at infinity, f1 denotes focal length of the first lens unit, f2 denotes focal length of the second lens unit, D2 denotes thickness of the second lens unit on an optical axis, and DL denotes thickness of the optical system on the optical axis when focusing on the object at infinity,
   where DL corresponds to a distance, on the optical axis, from a lens surface at the extreme end on the object side to a lens surface at the extreme end on the image side in the optical system.

2. The optical system according to claim 1,
   wherein the second lens unit includes a negative lens, and
   wherein the optical system satisfies the following conditional expression:

$35.00 < vd2n < 100.00$ where vd2n denotes Abbe number, for d-line, of a material forming the negative lens included in the second lens unit.

3. The optical system according to claim 1, further comprising:
   an aperture stop,
   wherein the optical system satisfies the following conditional expression:

$0.65 < |DSP/DL| < 0.95$ where DSP denotes distance from the aperture stop to an image plane on an optical axis when focusing on the object at infinity.

4. The optical system according to claim 1,
   wherein the optical system satisfies the following conditional expression:

$0.20 < BF/f < 1.80$ where BF denotes back focal length of the optical system when focusing on the object at infinity, and f denotes focal length of the optical system when focusing on the object at infinity.

5. The optical system according to claim 1,
   wherein the optical system satisfies the following conditional expression:

$1.00 < |EXP/f| < 4.00$ where EXP denotes distance from an exit pupil of the optical system to an image plane on an optical axis when focusing on the object at infinity, and f denotes focal length of the optical system when focusing on the object at infinity.

6. The optical system according to claim 1,
   wherein the optical system satisfies the following conditional expression:

$0.50 \le -\beta$ where β denotes lateral magnification of the optical system when focusing on an object at a shortest distance.

7. The optical system according to claim 1, wherein the first lens unit includes lens sub-unit that shifts an imaging position in a direction perpendicular to an optical axis by moving in a direction containing a component perpendicular to the optical axis.

8. The optical system according to claim 1, consisting of, in order from the object side toward the image side:
   the first lens unit having positive refractive power; and
   the second lens unit having negative refractive power.

9. The optical system according to claim 1, consisting of, in order from the object side toward the image side:
   the first lens unit having positive refractive power;
   the second lens unit having negative refractive power; and
   a third lens unit having positive refractive power,
   wherein the third lens unit is stationary during focusing.

10. The optical system according to claim 1, consisting of, in order from the object side toward the image side:
    the first lens unit having positive refractive power;
    the second lens unit having negative refractive power; and
    a third lens unit having negative refractive power,
    wherein the third lens unit is stationary during focusing.

11. An optical system comprising, in order from an object side toward an image side:
    a first lens unit having positive refractive power; and
    a second lens unit having negative refractive power,
    wherein a distance between consecutive ones of the lens units changes when focusing is performed,
    wherein the first lens unit is stationary during focusing, and the second lens unit is moved toward the image side when focus is changed from an object at infinity to an object at a short distance, and
    wherein the optical system satisfies the following conditional expressions:

$3.00 < |1-\beta2^2| < 8.00$ $0.20 < |f1/f2| < 0.59$ $0.65 < |DSP/DL| < 0.95$ where β2 denotes lateral magnification of the second lens unit when focusing on the object at infinity, f1 denotes focal length of the first lens unit, f2 denotes focal length of the second lens unit, DSP denotes distance from the aperture stop to an image plane on an optical axis when focusing on the object at infinity, and DL denotes thickness of the optical system on the optical axis when focusing on the object at infinity,
    where DL corresponds to a distance, on the optical axis, from a lens surface at the extreme end on the object side to a lens surface at the extreme end on the image side in the optical system.

12. An optical system comprising, in order from an object side toward an image side:
    a first lens unit having positive refractive power; and
    a second lens unit having negative refractive power,
    wherein a distance between consecutive ones of the lens units changes when focusing is performed,
    wherein the first lens unit is stationary during focusing, and the second lens unit is moved toward the image side when focus is changed from an object at infinity to an object at a short distance, and wherein the optical system satisfies the following conditional expressions:

$$3.00 < |1-\beta 2^2| < 8.00$$

$$0.20 < |f1/f2| < 0.59$$

$$1.00 < |EXP/f| < 4.00$$

where β2 denotes lateral magnification of the second lens unit when focusing on the object at infinity, f1 denotes focal length of the first lens unit, f2 denotes focal length of the second lens unit, EXP denotes distance from an exit pupil of the optical system to an image plane on an optical axis when focusing on the object at infinity, and f denotes focal length of the optical system when focusing on the object at infinity.

13. An optical system consisting of, in order from an object side toward an image side:
   a first lens unit having positive refractive power; and
   a second lens unit having negative refractive power,
   wherein a distance between consecutive ones of the lens units changes when focusing is performed,
   wherein the first lens unit is stationary during focusing, and the second lens unit is moved toward the image side when focus is changed from an object at infinity to an object at a short distance, and
   wherein the optical system satisfies the following conditional expressions:

$$3.00 < |1-\beta 2^2| < 8.00$$

$$0.20 < |f1/f2| < 0.59$$

where β2 denotes lateral magnification of the second lens unit when focusing on the object at infinity, f1 denotes focal length of the first lens unit, and f2 denotes focal length of the second lens unit.

14. An optical system consisting of, in order from an object side toward an image side:
   a first lens unit having positive refractive power;
   a second lens unit having negative refractive power; and
   a third lens unit having positive refractive power,
   wherein a distance between consecutive ones of the lens units changes when focusing is performed,
   wherein the third lens unit is stationary during focusing,
   wherein the first lens unit is stationary during focusing, and the second lens unit is moved toward the image side when focus is changed from an object at infinity to an object at a short distance, and
   wherein the optical system satisfies the following conditional expressions:

$$3.00 < |1-\beta 2^2| < 8.00$$

$$0.20 < |f1/f2| < 0.59$$

where β2 denotes lateral magnification of the second lens unit when focusing on the object at infinity, f1 denotes focal length of the first lens unit, f2 denotes focal length of the second lens unit.

15. An optical system consisting of, in order from an object side toward an image side:
   a first lens unit having positive refractive power;
   a second lens unit having negative refractive power; and
   a third lens unit having negative refractive power,
   wherein a distance between consecutive ones of the lens units changes when focusing is performed,
   wherein the third lens unit is stationary during focusing,
   wherein the first lens unit is stationary during focusing, and the second lens unit is moved toward the image side when focus is changed from an object at infinity to an object at a short distance, and
   wherein the optical system satisfies the following conditional expressions:

$$3.00 < |1-\beta 2^2| < 8.00$$

$$0.20 < |f1/f2| < 0.59$$

where β2 denotes lateral magnification of the second lens unit when focusing on the object at infinity, f1 denotes focal length of the first lens unit, f2 denotes focal length of the second lens unit.

16. An imaging apparatus comprising:
   an optical system according to claim 1; and
   an imaging device configured to receive an image formed by the optical system.

17. An imaging apparatus comprising:
   an optical system according to claim 11; and
   an imaging device configured to receive an image formed by the optical system.

18. An imaging apparatus comprising:
   an optical system according to claim 12; and
   an imaging device configured to receive an image formed by the optical system.

19. An imaging apparatus comprising:
   an optical system according to claim 13; and
   an imaging device configured to receive an image formed by the optical system.

20. An imaging apparatus comprising:
   an optical system according to claim 14; and
   an imaging device configured to receive an image formed by the optical system.

21. An imaging apparatus comprising:
   an optical system according to claim 15; and
   an imaging device configured to receive an image formed by the optical system.

* * * * *